United States Patent [19]

DiPietro et al.

[11] Patent Number: 5,257,057
[45] Date of Patent: Oct. 26, 1993

[54] MAGAZINE FOR A STACK OF FILM SHEETS

[75] Inventors: Matthew DiPietro, Webster; Thomas J. Kausch; Vincent B. Dethier, both of Rochester, all of N.Y.

[73] Assignee: Eastman Kodak Company, Rochester, N.Y.

[21] Appl. No.: 902,350

[22] Filed: Jun. 22, 1992

[51] Int. Cl.$^5$ ............................................. G03B 17/26
[52] U.S. Cl. ................................ 354/276; 242/67.1 R; 242/74; 378/182
[58] Field of Search ............... 354/275, 276, 277, 278, 354/279, 280, 281, 282, 283, 284, 285; 206/451, 455; 242/67.1 R, 74; 378/182; 414/412, 789.9

[56] References Cited

U.S. PATENT DOCUMENTS

| | | | |
|---|---|---|---|
| 3,912,932 | 10/1975 | Matsumoto et al. | 250/475.2 |
| 3,934,735 | 1/1976 | Schmidt | 414/798.9 |
| 4,135,800 | 1/1979 | Weldanz et al. | 354/174 |
| 4,531,878 | 7/1985 | Tamura | 414/412 |
| 4,537,307 | 8/1985 | Tamura | 206/455 |
| 4,555,213 | 11/1985 | Tamura et al. | 414/412 |
| 4,571,140 | 2/1986 | Yamada et al. | 414/412 |
| 4,725,011 | 2/1988 | Zanner et al. | 242/67.1 R |
| 4,727,391 | 2/1988 | Tajima et al. | 354/277 |
| 4,738,366 | 4/1988 | Schmidt et al. | 206/455 |
| 4,783,019 | 11/1988 | Schmidt et al. | 242/74 |
| 4,799,591 | 1/1989 | Tajima et al. | 206/455 |
| 4,809,313 | 2/1989 | Gandolfo | 378/182 |
| 4,876,706 | 10/1989 | Tajima | 378/174 |
| 4,909,389 | 3/1990 | Plessers et al. | 206/451 |
| 5,055,869 | 10/1991 | DiPietro | 354/276 |

FOREIGN PATENT DOCUMENTS

1062043 8/1983 Italy .

*Primary Examiner*—Michael L. Gellner
*Assistant Examiner*—Howard B. Blankenship
*Attorney, Agent, or Firm*—Frank Pincelli

[57] ABSTRACT

A supply magazine for use in an apparatus for removing individual film that has been placed within a light-tight pouch having a leader secured to the leading edge. The magazine has a base which receives and retains a stack of sheet film within the light-tight pouch, and a cover secured to the base which can be rotated between a closed position and an open position. A take-up spindle is rotatably secured within the base for winding of the pouch thereon. The improvement comprises a lever arm for biasing the leader toward the spindle which cooperates with hook provided on the spindle when the cover is in the closed position. The lever arm includes a clamp pad which has a configuration which forms a resistive wall section in the leader when the magazine is in the closed position such that when the spindle is rotated, the hooks will engage the leader at the resistive wall section allowing the pouch to be wound around the spindle.

22 Claims, 12 Drawing Sheets

MAGAZINE FOR A STACK OF FILM SHEETS

FIELD OF THE INVENTION

The present invention relates to an improved magazine of the kind used for receiving a stack of film sheets enclosed in a flexible bag or package, and wherein the package is removed from the sheets to enable feeding seriatim of the sheets from the magazine.

BACKGROUND OF THE INVENTION

Typically, the package containing film is placed in a magazine having a spindle, and the leader of the package is attached to the spindle. Various methods have been suggested in the prior art for securing the leader to the spindle, including the threading of the leader through a slot in the spindle, the use of "Velcro" at the end of the leader, the providing of holes in the leader to receive a hook provided on the spindle, and the use of gears for grabbing of the leader. These methods of attaching the leader to the spindle suffer from numerous drawbacks. Typically, the leader must be carefully manipulated by the operator to assure that the leader properly engages the spindle. Further, many of these solutions require specially modified packages, or a costly magazine construction. Magazines of the type generally described above, are disclosed, for example, in U.S. Pat. Nos. 4,725,011; 4,909,389; 4,938,366; 4,555,213; 4,531,878; 4,537,307; 4,571,140; 4,135,800; 4,809,313; 4,727,391; 4,876,706; 3,934,735; and Italian Patent No. 1,062,043.

Applicant has invented an improved magazine which is simple in construction, requires a minimal amount of manipulation of the package and leader by the operator, is very reliable in securing of the leader to the spindle and can be easily removed from the spindle. The invention and its other advantages will become more apparent in the "Detailed Description of the Preferred Embodiment" presented below.

SUMMARY OF THE INVENTION

The present invention is directed to a supply magazine for use in an apparatus for removing individual sheets of film that have been placed within a light-tight pouch having a leader secured to the leading edge. The magazine has a base which receives and retains a stack of sheet film within the light-tight pouch, and a cover secured to the base which can be rotated between a closed position and an open position. A take-up spindle is rotatably secured within the base for winding of the pouch thereon. The improvement comprises means for biasing the leader toward the spindle which cooperates with hook means provided on the spindle when the cover is in the closed position. The means for biasing the leader forms a resistive wall section in the leader such that when the spindle is rotated, the hook means will automatically engage the leader at the resistive wall section allowing the pouch to be wound around the spindle.

BRIEF DESCRIPTION OF THE DRAWINGS

In the "Detailed Description of the Preferred Embodiment" presented below, reference is made to the accompanying drawings, in which.

DETAIL DESCRIPTION OF THE PREFERRED EMBODIMENT

In accordance with the present invention, a reusable, interchangeable film magazine is adapted to receive and hold a package containing a stack of film sheets enclosed within a light-tight flexible pouch, and to remove the package so that the sheets can be removed seriatim from the magazine and exposed, processed, etc. Before proceeding with a description of the magazine of the present invention, a package suitable for use with the magazine will be described briefly.

Figure 2:
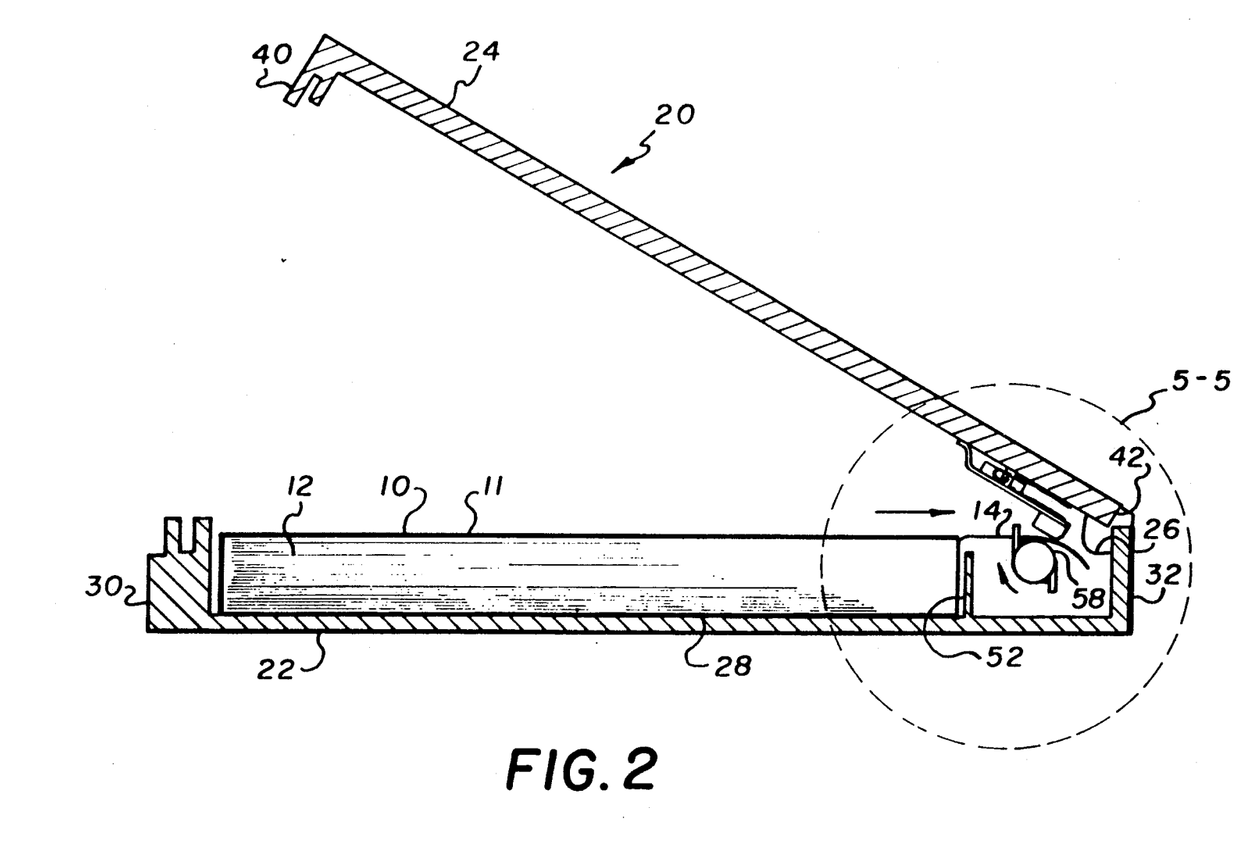
FIG. 2 is a cross-sectional view of the magazine of FIG. 1 taken along line 2—2 illustrating the magazine in the open position.
Figure 3:
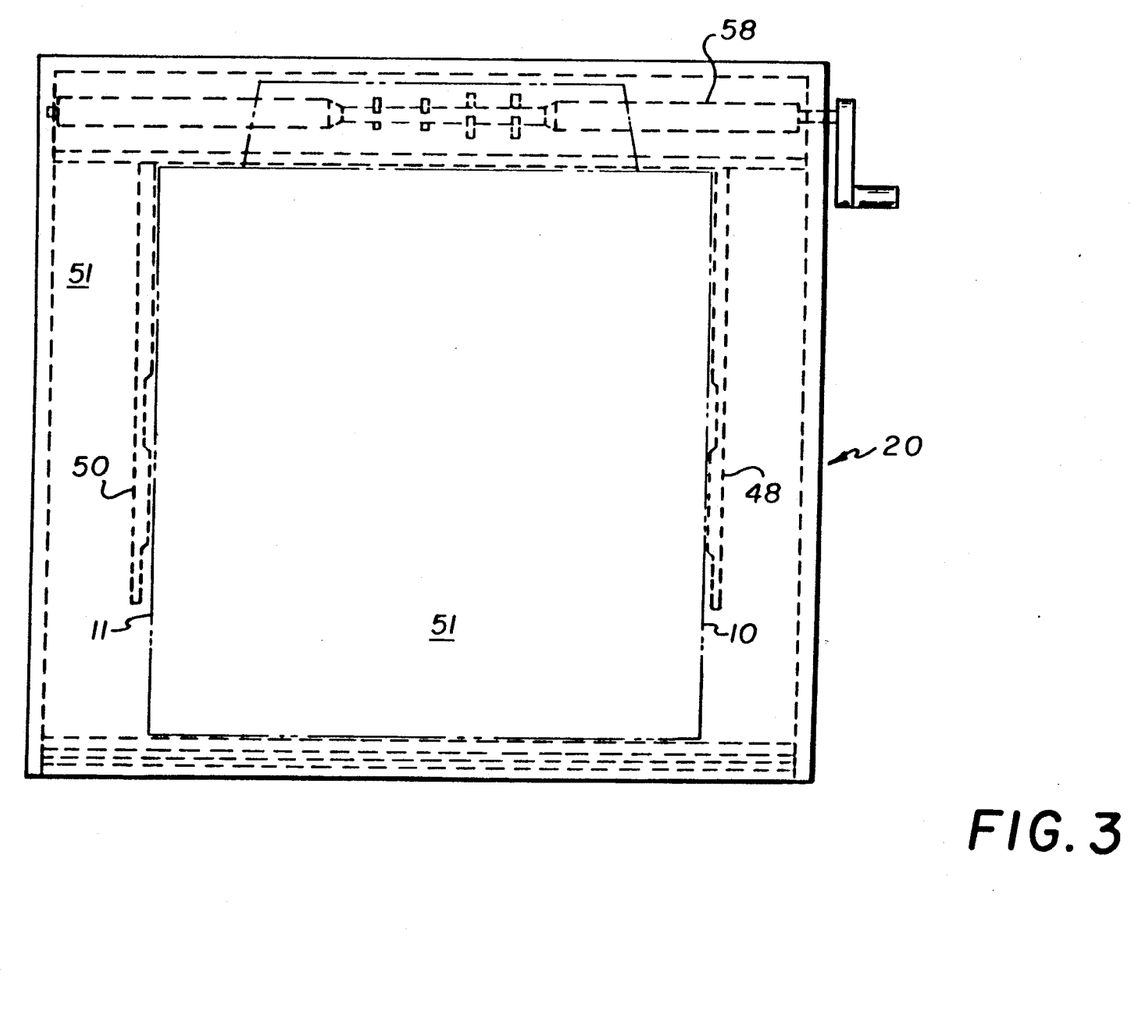
FIG. 3 is a top plan view of the magazine of FIG. 1 illustrating in phantom lines a package having a stack of sheets enclosed therein.
Figure 5:
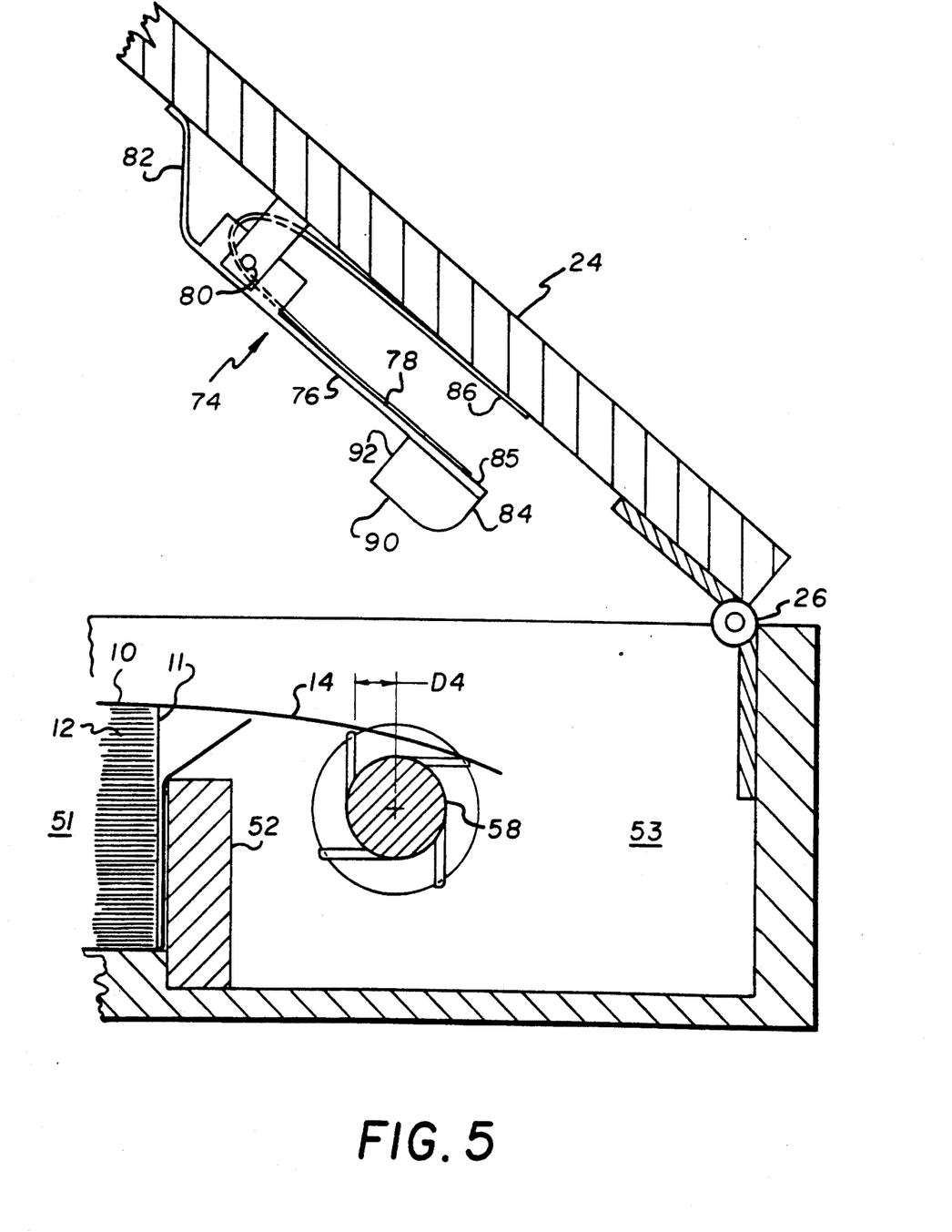
FIG. 5 is an enlarged partial cross sectional view of the portion of the magazine of FIG. 2 as outlined by line 5—5.

Referring to FIGS. 2, 3 and 5, a package, generally designated by reference numeral 10, comprises a light-tight pouch 11 designed to hold a stack of film sheets 12 therein. The package 10 further includes a leader 14 secured to the leading edge of the pouch 11. Film sheets 12 may comprise, for example, sheets of x-ray film. Sheets 12 in a particular package 10 preferably are all the same size, however, similar film pouches 10 can contain film sheets 12 of various sizes. The pouch 11 can be formed from a flexible barrier wrap material which is placed around the stack of film sheets 12. The material forming the pouch is typically heat-sealed as required to form a light-tight package around the film sheets 12. In the particular embodiment illustrated the pouch comprises laminated layers of a polyolefin material including a black modified high density polyethylene layer, and a metallized polyester or metallized oriented polypropylene layer with the black layer comprising the inner surface of the pouch 11. The pouch 11 can, of course, be made of any other suitable material.

The leader 14 is made of a material having sufficient strength to enable the pouch to be pulled off the stack of sheets 12 yet flexible enough to provide the degree of flexibility necessary for proper engagement with the spindle as later described. In the particular embodiment illustrated the leader 14 is made of a polyolefin material, such as rubber modified high density polyethylene and has a thickness of about 0.0045 inches (0.011 cms) and is heat sealed to pouch 11.

Figure 1:
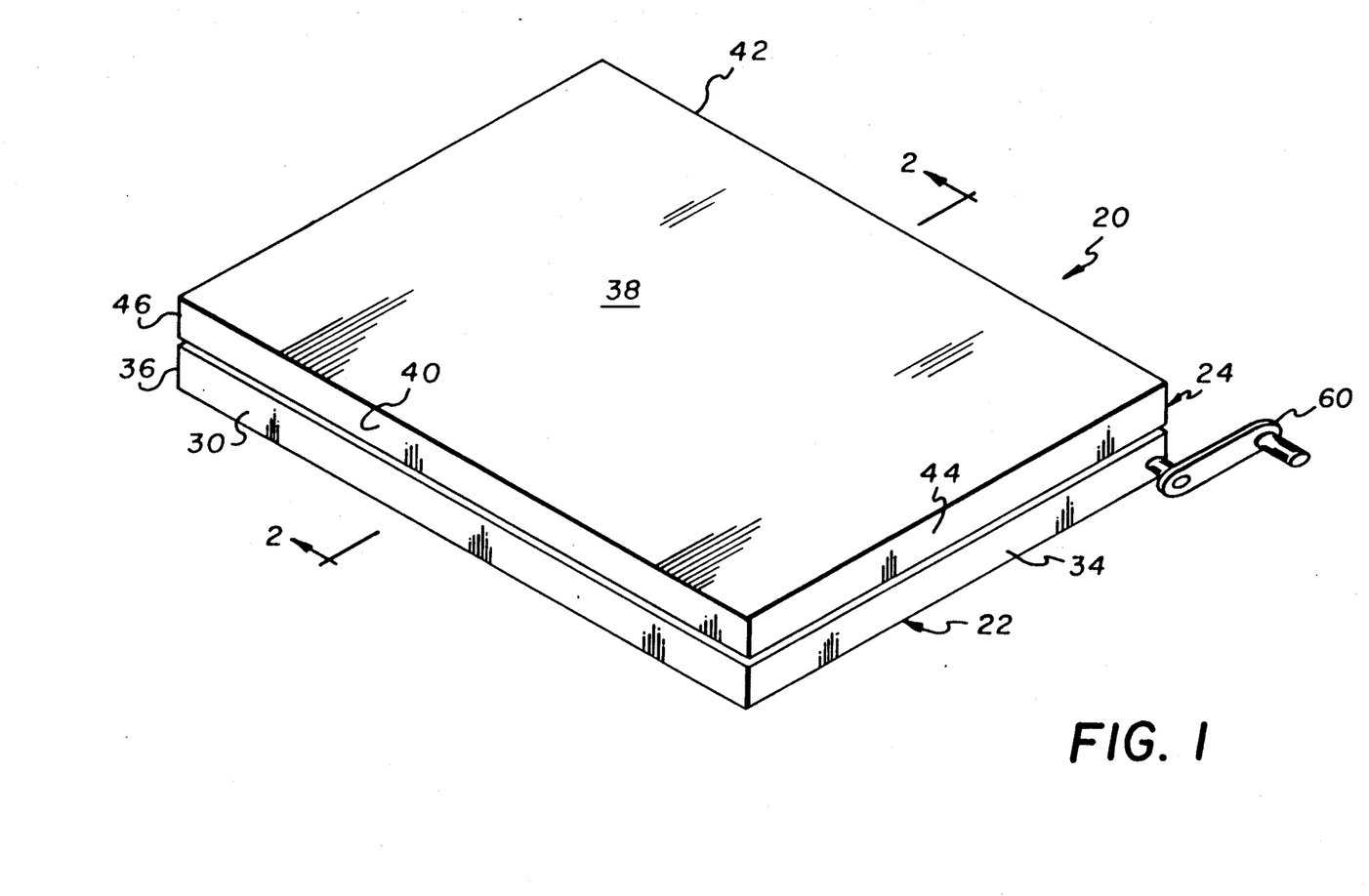
FIG. 1 is a perspective view of a magazine made in accordance with the present invention in the closed position.
Figure 6:
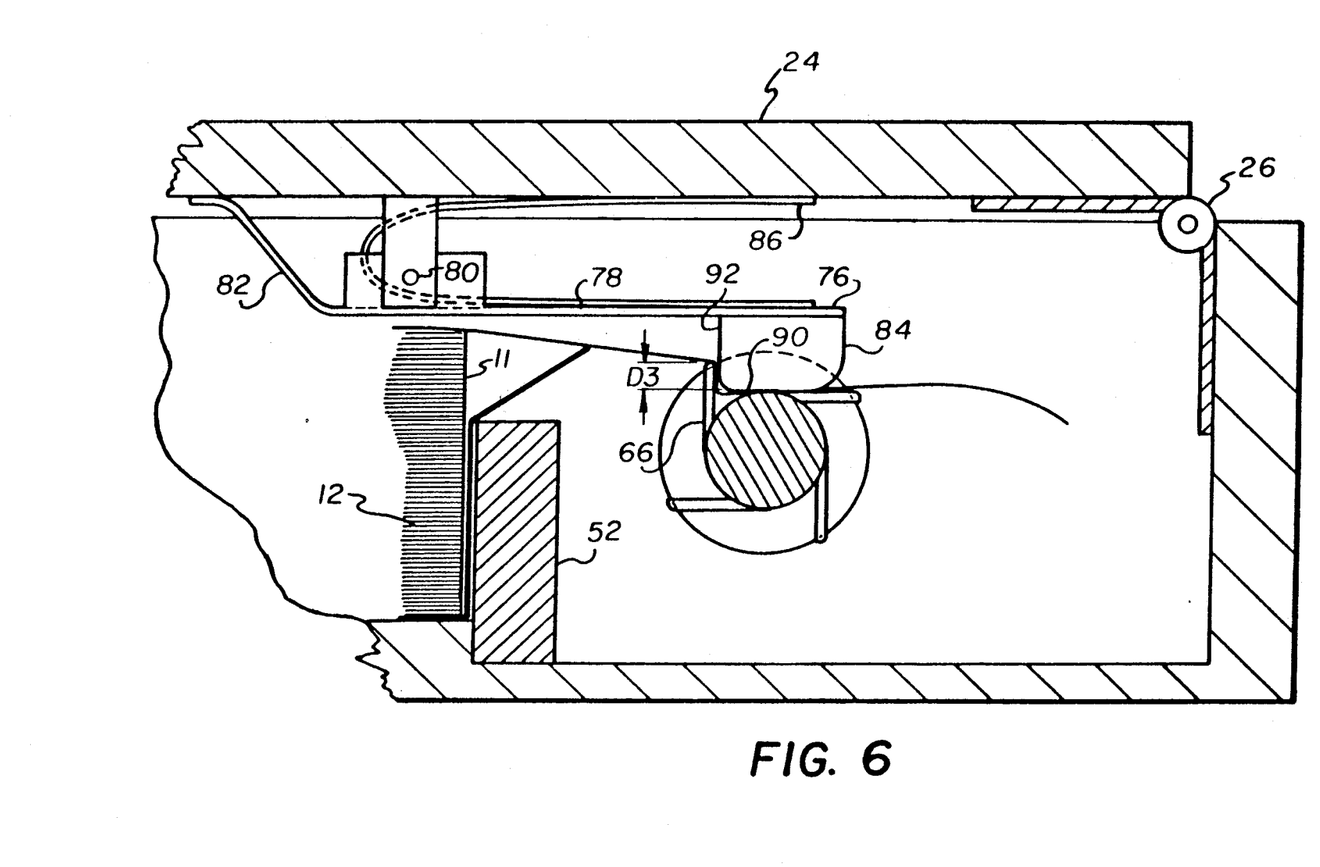
FIG. 6 is a view similar to FIG. 5 illustrating the magazine in the closed position.
Figure 7:
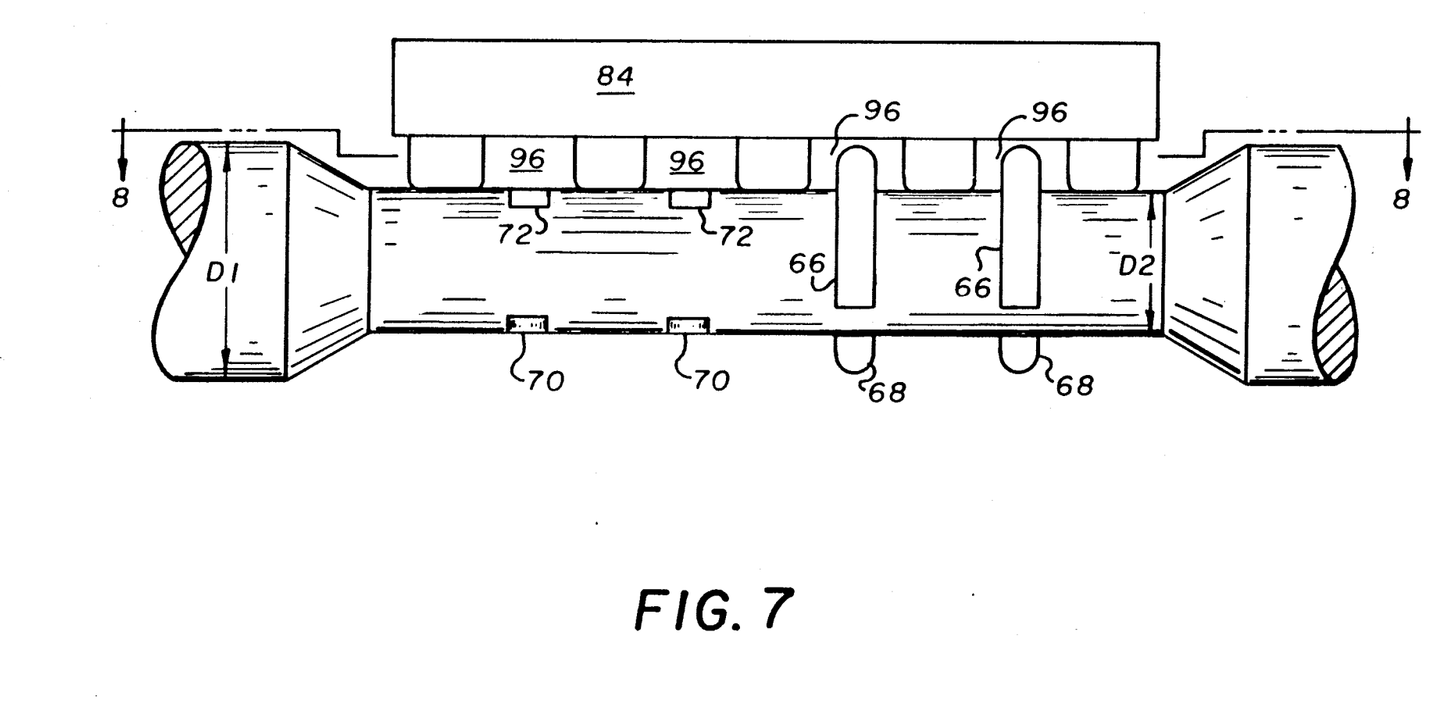
FIG. 7 is an enlarged partial elevational view of the spindle as taken along line 7—7 of FIG. 4 and the associated clamp pad when the cover is in the closed position.

Referring now to FIGS. 1-9, a magazine 20 of the present invention is illustrated, and preferably comprises a base 22 and a cover 24 which is secured to the base 22 by hinges 26 along one side for moving the cover 24 between a closed position, as illustrated by FIGS. 1 and 6, and an open position as illustrated by FIGS. 2 and 5. The base 22 comprises a generally flat bottom 28 surrounded by a front wall 30, a rear wall 32, and a pair of side walls 34,36, all of which project upwardly above the inner surface of the bottom 28. Similarly, the cover 24 comprises a top 38 which is surrounded by a front wall 40, a rear wall 42, and a pair of side walls 44,46 which project downwardly from the top 38. The front wall, rear wall, and side walls of the cover and base contact corresponding walls of the other portion and of the magazine, and jointly define with the bottom and top a space within the magazine for receiving pouch 11. The magazine 20 is provided with means (not shown) for maintaining the cover 24 in an open position as illustrated in FIGS. 2 and 5. The providing of such mechanisms is well known in the art, and does not form a part of the present invention. It being understood that any means available may be incorporated in the magazine for maintaining the cover in the open position. Likewise, an appropriate latching mechanism may be provided for maintaining the cover 12 in the closed position on base 22.

In the particular embodiment illustrated, a pair of locator bars 48,50, as best seen by reference to FIG. 3, are provided inside the magazine for accurately positioning the pouch 11 laterally within the magazine 20. Bars 48,50 preferably are mounted on the bottom 28 of the base 22 of the magazine 20 so that when the cover 24 is moved to its open position, the pouch 11 can be conveniently positioned in the base 22 of the magazine. Bars 48,50 are parallel to each other and side walls 34,36. Preferably the locator bars 48,50 are adjustable to a plurality of positions so that packages containing film of various sizes can be accurately located within the magazine. This can be accomplished, for example, by providing pins on the bottom of the locator bars 48,50, and a series of holes in the bottom 28 of the magazine 20 for receiving the pins and holding of locator bars 48,50 in position.

A bar stop 52 is secured to the bottom 28 of base 22 and is parallel to the front and rear walls 30,32. The bars 48,50, front wall 30 and bar stop 52 form a retention area 51 for receiving a stack of sheet film 12 placed within the pouch 11. As previously discussed, the locator bars 48,50 are preferably adjustable to accommodate various size stacks of sheets of film. The bar stop 52, rear wall 32, and side walls 34,36 form a pouch retention area 53 for receiving the package 10 as it is pulled off of the stack of sheets 12.

A take-up spindle 58 is rotatably secured to the base portion 22 in the pouch retention area 53. The spindle 58 can be rotated, for example, by a crank or handle 60 to wind the leader 14 about the spindle 58. Alternatively, the spindle 58 can be rotated by a motor connected to the spindle directly, or indirectly. The take-up spindle 58 is provided with means for automatically engaging the leader 14 of the pouch that has been properly placed within the magazine 10. The magazine 20 is designed such that the operator simply places a pouch 11 within the retention area 51 and lays the leader 14 over the spindle 58 such that when the cover 24 is closed on the base 22, the leader 14 will automatically engage the take-up spindle 58 as the spindle 58 is rotated.

Figure 4:
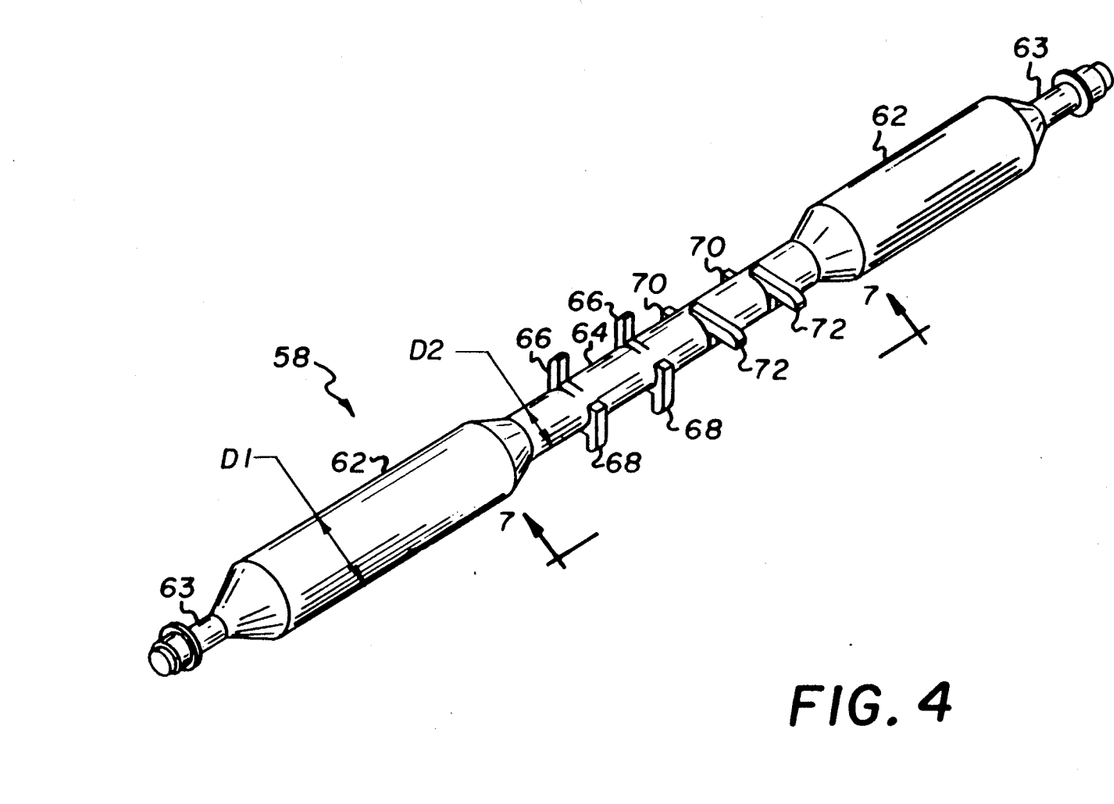
FIG. 4 is a perspective view of the take-up spindle used for removing the package from the stack of sheets.

As seen in FIGS. 3 and 4, the take-up spindle 58 comprises a pair of outer cylindrical support sections 62 and a cylindrical gripping section 58 located between the outer support sections 62. The lateral ends 63 of outer support sections are rotatably mounted to the side walls 34,36 in a manner as is well known to those skilled in the art. The gripping section 64 is preferably located along the spindle 58 such that it is positioned substantially centrally with respect to the middle of the leader 14 of a package placed in magazine 20. The spindle in gripping section 64 has a diameter D2 which is preferably smaller than the diameter D1 of spindle in outer support sections 62. In the particular embodiment illustrated, D1 is 0.750 inches (1.91 cms) and D2 is 0.375 inches (0.95 cms).

The gripping section 64 is provided with hook means designed to automatically engage the leader 14 in a manner such that the pouch 11 can be pulled off of the stack of sheets 12. In the particular embodiment illustrated, as best seen by reference to FIGS. 4,7 and 8, there is provided a first pair of axially aligned hooks 66, and a second pair of axially aligned hooks 68. The second pair of hooks 68 is circumferentially spaced approximately 180° about the spindle from the first pair of hooks 66 and is circumferentially aligned with respect to the first pair of hooks 66 such that when the spindle 58 is rotated, the first and second pair of hooks 66,68 pass through the same circumferential plane perpendicular to the axis of rotation of the spindle 58.

In the particular embodiment illustrated, a third and fourth pair of hooks 70,72, respectively, are also provided in the central gripping section 64. The third and fourth pair of hooks 70,72 are spaced circumferentially about the spindle 58 in the same manner as the first and second pair of hooks 66,68. That is, the third and fourth pair of hooks 70,72 are spaced approximately 180° apart from each other, and are aligned circumferentially such that they rotate in the same plane perpendicular to the axis of rotation of the spindle 58. The third and fourth pair of hooks 70,72 are preferably spaced axially apart from the first and second pair of hooks 66,68, such that all the hooks are located substantially in the central area of the leader 14 that is to be placed thereon.

Figure 8:
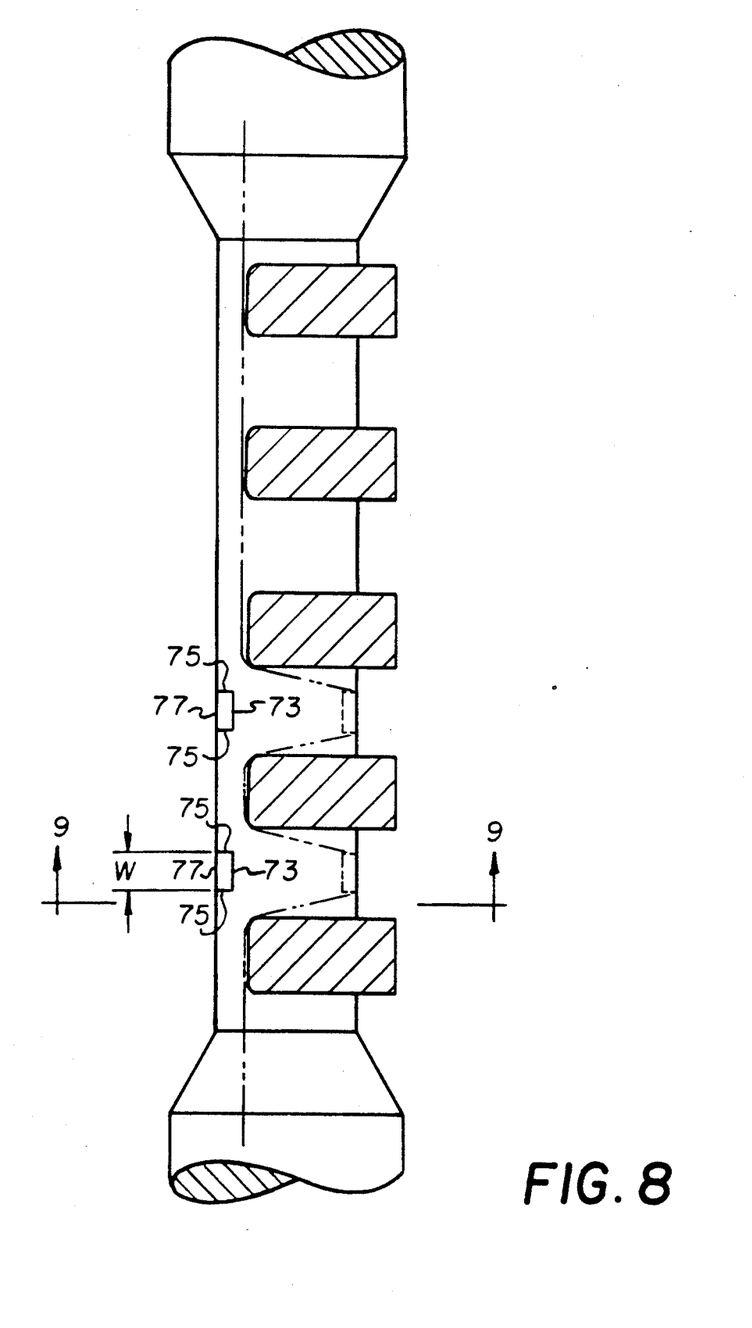
FIG. 8 is a cross sectional view of the clamp pad and top plan view of the spindle as taken along line 8—8 of FIG. 7.
Figure 9A:
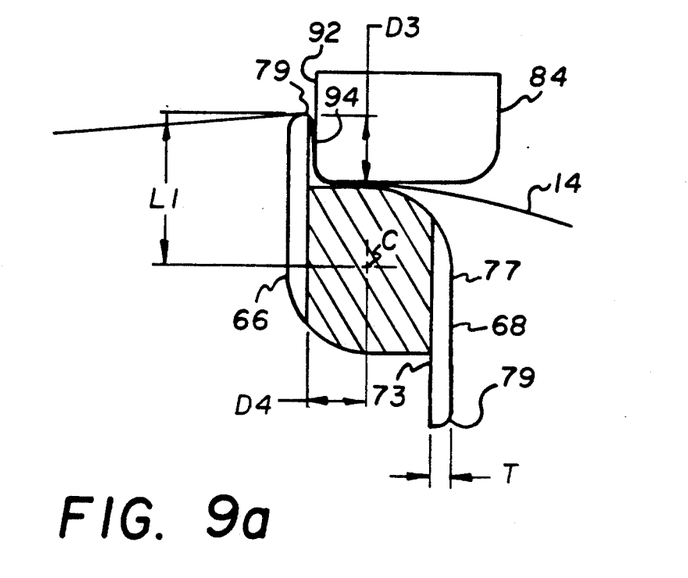
FIGS. 9A-9D illustrate an enlarged crosssectional view of the spindle and pad as taken along line 9—9 of FIG. 8 illustrating the relative relationship between the hook means and clamp pad at various sequential rotational positions of the spindle.

The hooks 66,68,70, and 72 each have a configuration designed to securely engage the leader yet allow the package 10 to be easily removed. In the preferred embodiment illustrated each hook has a substantially rectangular cross-sectional configuration as shown in FIGS. 8 and 9 and extends from the surface of the spindle 58 in a direction substantially tangent to the surface of the spindle 58. Each hook has a forward engaging surface 73, a pair of sidewalls 75, trailing surface 77, a thickness t, a width W1 and a length L1. The length L1 is selected so that the terminal end 79 of the hook extends a distance D3 past the surface of gripping section 64 such that it can properly engage the leader 14 as is described in detail later herein. In the particular embodiment illustrated t is 0.050 inches (1.27 cms), W1 is 0.10 inches (0.254 cms) and L1 is such that the diameter circumscribed by the tip 79 of the hook during rotation is, 0.750 inches (1.905 cms). The surfaces 73,75 and 77 (as best seen in FIG. 8 and 9A) are preferably substantially planar so as to allow the hooks to easily disengage the package 10 as the package is unwound from the spindle. The locating of the hooks at a distance D4 from the center of rotation C of the spindle 58 orients the hooks at an angle of attack which is conducive to providing a secure engagement with the leader, and also allow the hooks to be easily disengaged from the package 10 as it is unwound from the spindle. The configuration of the tip 79 and remaining edges of each hook is preferably shaped so as to not have any sharp edges on which the operator may be injured. In the embodiment illustrated, the edges are slightly rounded.

Means are provided for biasing the leader 14 against the take-up spindle 58. In the preferred embodiment illustrated, (see FIGS. 5 and 6) this takes the form of a hold-down lever assembly 74 which is secured to the cover 24. The hold-down lever assembly 74 includes a lever arm 76 which is pivotally mounted to the cover 24 about pivot 80. The lever includes a forward portion 78 disposed on one side of the pivot 80, and a rear extension 82 which extends on the other side of the pivot point 80. The rear extension 82 has a configuration which limits the motion of the lever arm 76 when the cover 24 is in the open position as shown FIG. 5. A clamp pad 84 is secured at the terminal end 85 of forward portion 78. A leaf spring 86 is provided in the forward portion 78 for biasing the clamp pad 84 against the take-up spindle 58 when the cover 24 is in the closed position. In the particular embodiment illustrated, the leaf spring 86 has a substantially U-shaped configuration and is wrapped about pivot 80. The spring 86 is selected so as to provide a predetermined amount of force against the spindle 58 such that the hooks 66,68,70,72 will properly engage the leader 14, but not too great that it will add any significant resistance to the winding of the package 10 about the spindle 58. Preferably, the leaf spring 86 is such that a force no greater than about 28 ounces is applied by clamp pad 84 against the spindle 56, preferably no less than about 24 ounces.

The clamp pad 84 includes a bottom engaging surface 90 and forward engaging surface 92. The bottom engaging surface 90 is designed to press directly against the take-up spindle 58 adjacent the hooks as best seen by reference to FIGS. 6 and 7. The forward engaging surface 92 is configured such that a resistive wall section is formed in the leader as the spindle is rotated as is discussed in greater detail later herein. When a pouch is initially placed within the magazine 20, the operator positions the leader such that it extends toward the rear wall 32 of the magazine and lies on top of the take-up spindle 48. When the cover 24 is placed in the closed position, the hold-down lever assembly 74 will clamp the leader 14 between the clamp pad 84 and take-up spindle 58 as illustrated in FIG. 6. The clamp pad 84 is provided with a plurality of recesses 96 which are positioned such that they allow corresponding hooks 66,68,70,72 to pass through the resistive wall formed in the leader 14 as the spindle 58 is rotated (see FIGS. 7 and 8).

Figure 9B:
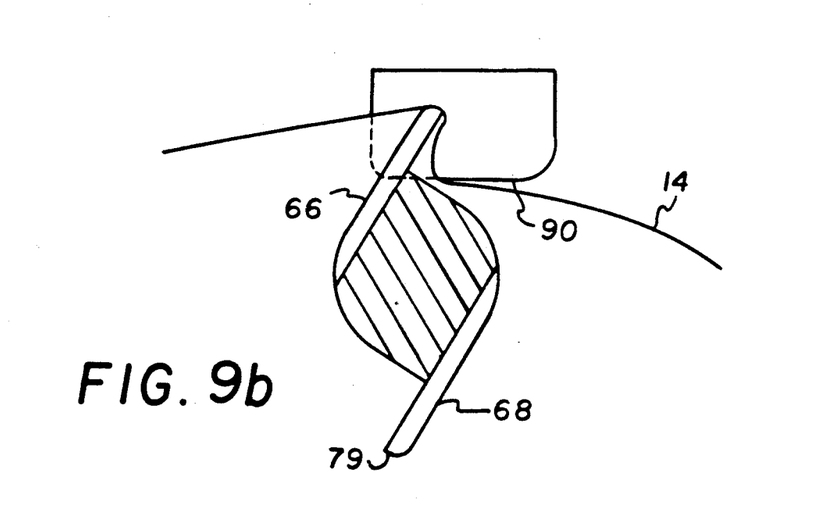
Figure 9C:
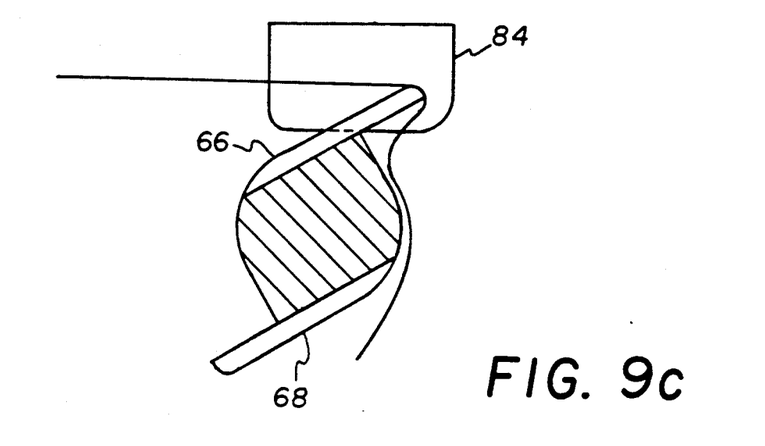
Figure 9D:
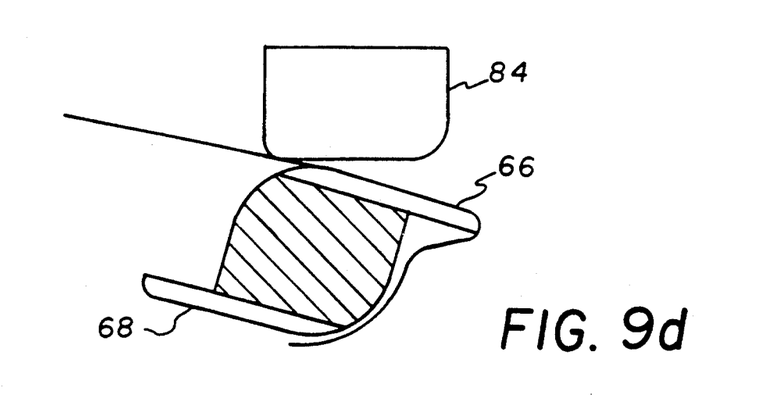

In order to more clearly understand the present invention, use of the magazine will now be discussed in detail. First, the cover 24 is placed in the open position as illustrated in FIGS. 2 and 5. Thereafter, a package 10 containing a stack of sheets 12 is placed therein in such a manner that the leader 14 extends toward the rear wall 32 of the base 22. The pouch 11 containing the sheets 12 is place in retention area 51. The leader 14 is simply placed on top of the spindle 58 in the pouch retention area 53 below the lever assembly 74. Then the operator simply closes the cover 24 on the base which results in the hold-down lever assembly 74 engaging the leader 14 in such a manner so as to clamp the leader between the clamp pad 84 and take-up spindle 58. Thereafter, the take-up spindle is rotated so as to cause the hooks to rotate in the direction indicated by arrow 98. This results in one of the pairs of hooks engaging the leader in a firm and secure manner so that the pouch can be wound upon the take-up spindle 58. In particular, referring to FIGS. 9A-9D, the relative position of the first pairs of hooks 66,68 is illustrated as they are rotated about the spindle 58. It is to be understood that hooks 70,72 are similarly rotated except that they are 90° out of phase with respect to hooks 66,68. The initial condition of the leader and hooks 66,68 is illustrated by FIG. 9A just prior to engagement with the leader 14. For the sake of clarity, only the action of a single pair of hooks 66 will be discussed. It is to be understood that the remaining pairs of hooks 68,70, and 72 operate in the same manner. The length L1 of hooks 66 is such that the terminal end 79 extends along forward engaging face 92 a distance D3 such that forward engaging wall 73 will pass through the resistive wall section 94 that is formed in the leader 14. Preferably, as illustrated in FIG. 9A the forward engaging wall 92 of clamp pad 84 is substantially parallel to the forward engaging wall 73 of hooks 66 and distance D3 is about 0.150 inches (0.34 cms). As illustrated by FIG. 9A, the forward engaging surface 73 forces a portion of the leader 14 against the forward engaging surface 92 of clamp pad 84 which results in a resistive wall section 94 being formed in the leader 14. In the particular embodiment illustrated, the clamp pad 84 has a configuration such that the leader 14 forms a substantially L-shaped configuration. As the hooks 66 continue in their rotation, as illustrated by FIGS. 9B and 9C, they penetrate or deform the leader in such a manner so as to firmly engage the leader 14. FIG. 9D illustrates the second pair of hooks 68 as they approach the clamp pad 84. The spindle 58 is continually rotated until a sufficient amount of the pouch 10 is removed to allow feeding of the sheets 12. Applicants have found that once the cover is closed, typically only the first pair of hooks to pass through the resistive wall section 94 will engage the leader 14. The providing of four pairs of hooks spaced at 90 degrees intervals about the spindle, as shown in the preferred embodiment, allows the spindle to engage the leader within about ¼ of a turn. Accordingly any desired number of hooks may be provided.

The leaf spring 86 allows the lever arm 76 to move toward the cover 24 so as to provide the appropriate space for winding of the package 10 on spindle 58. As can be seen, due to the configuration of the clamp pad and its action with the spindle, a resistive wall section 94 is formed in the leader. This allows the hooks to firmly engage the leader in such a manner so as to allow the package to be easily wound about take-up spindle 58. As the package is being wound about spindle 58, the pad 84 will move upward, causing the lever assembly 74 to rotate about pivot 80.

Figure 10:
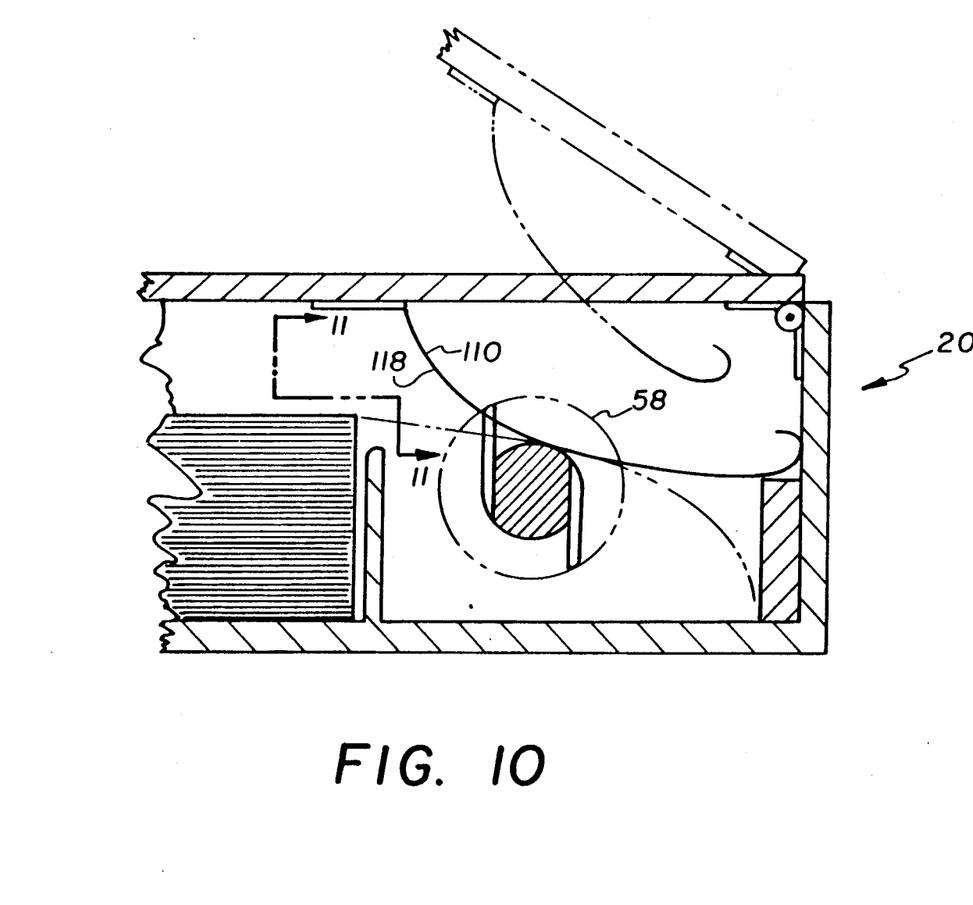
FIG. 10 is an enlarged cross-sectional view of a magazine similar to FIG. 5 illustrating a modified bias means for biasing the leader against the spindle.
Figure 11:
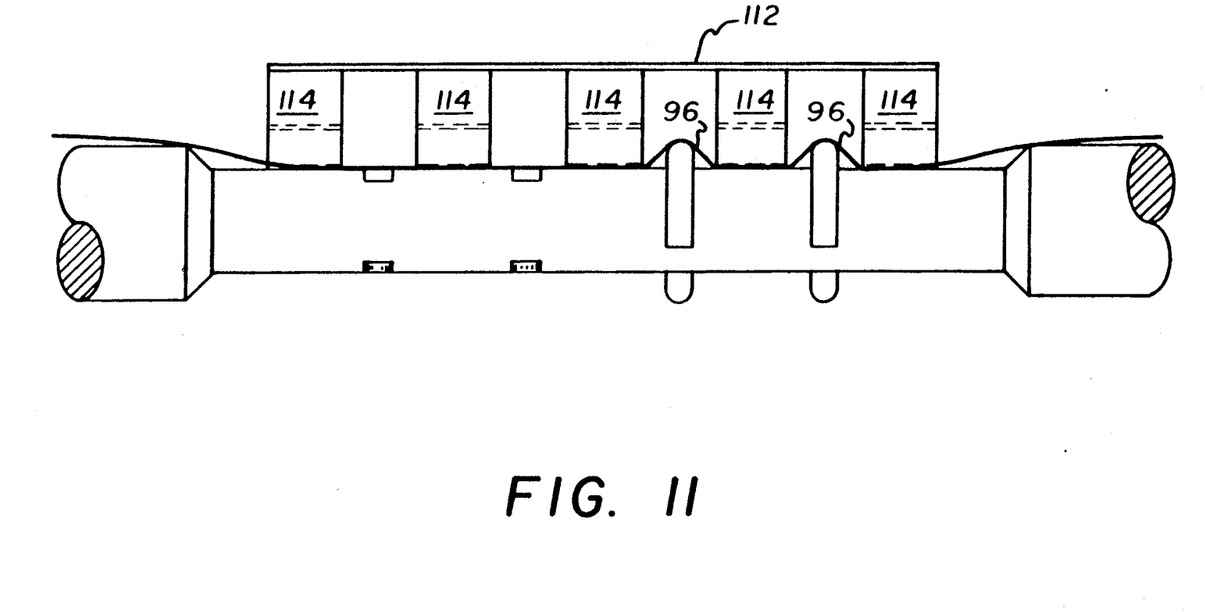
FIG. 11 is a front partial elevational view of the magazine of FIG. 10 as taken along line 11—11.

Referring to FIGS. 10 and 11, there is illustrated a modified magazine 20 made in accordance with the present invention, like numerals indicating like parts as previously described. The magazine 20 in FIG. 10 is shown in the closed position by solid lines and in the open position by dashed lines. In this embodiment, modified means for biasing the leader 14 against the spindle 58. In particular, a comb leaf spring 110 is provided. Spring 110 comprises a base member 112 which is secured to the cover 24 and a plurality of spaced individual tines 114. The spaces 116 formed between adjacent tines 114 are designed to receive hooks 66,68,70,72 in the same manner as recess 96 in clamp pad 84. The tines 114 have an outer engaging surface 118 which applies a force against spindle 58 and leader 14. The tines 114 are made of an appropriate material and have a configuration such that the desired force is applied against the spindle 58. In the embodiment illustrated, the outer engaging surface 118 have a generally arcuate configuration. The leader 14 is positioned within the magazine in the same manner previously discussed. After the cover 24 is closed, the spindle 58 is rotated, thus causing the hooks 66,68,70,72 to engage the leader. After all the sheets have been removed, the cover 24 is opened and the package 10 removed in the same manner previously discussed with respect to the embodiment of FIGS. 1–9. In the open position, as illustrated in FIG. 10, the spring 110 is positioned out of the way which allows easy removal of a wrapped package and insertion of a freshly filled package.

One advantage of the present invention is that no special manipulation of the leader is required by the operator. The operator need only lay the leader over the spindle and close the magazine. As the spindle is rotated, the cooperation of the hold-down lever and hooks will result in the automatic engagement of the spindle with the leader.

An additional advantage of the present invention is that the package can be easily removed from the spindle after all the sheets have been removed. To remove the package, the cover is opened, and the package is grasped and pulled by the operator, causing the take-up spindle to be rotated in the opposite direction that was used to wind the package thereon. The substantially planar configuration of the hooks and their location on the spindle permit the hooks to easily disengage from the package.

A further advantage of the present invention is that secure engagement of the leader with the spindle may obtained without the use of sharp hooks that may potentially injure the operator.

It is to be understood that various modifications may be made to the present invention without departing from the scope of the present invention. The present invention being limited by the following claims.

We claim:

1. A supply magazine for use in an apparatus for removing individual sheet film, the sheet film being arranged in a stack and placed within a light-tight pouch having a leader secured to the leading edge, said supply magazine comprising;
    a base having a receiving section for holding and retaining the stack of sheet film within the light-tight pouch;
    a cover secured to said base by hinges along one side permitting said cover to move between a closed position and an open position on said base;
    a take up spindle rotatably secured within said base for winding of the pouch thereon;
    hook means secured to the spindle for engaging the leader of the pouch; and
    a clamp pad secured to the cover, said clamp pad is positioned such that when the cover is in the closed position said clamp pad is biased against the leader of the pouch placed in the base so as to cause the leader to be pressed against the spindle in the area in which said hook means rotates, said clamp pad having a configuration such that a resistive wall section is formed in the leader so that when said spindle is rotated said hook means engages the leader at the resistive wall section allowing the pouch to be wound around the spindle.

2. A supply magazine according to claim 1 wherein said hook means comprises a first pair of axially aligned hooks and a second pair of axially aligned hooks, said first and second pair of hooks are circumferentially aligned about the spindle and spaced apart approximately 180°.

3. A supply magazine according to claim 2 wherein said hook means further comprises a third pair of axially aligned hooks and a fourth pair of axially aligned hooks, said third and fourth pair of hooks are circumferentially aligned about the spindle and spaced approximately 180° apart, said third and fourth pair of hooks are spaced axially apart from said first and second pair of hooks, said third and fourth pair of hooks are circumferentially offset from first and second pair of hooks by approximately 90°.

4. A supply magazine according to claim 1 wherein said spindle comprises a pair of cylindrical outer support sections and a cylindrical gripping section, said gripping section is located between said outer support sections, said pair of outer cylindrical support sections having a first outer diameter and said cylindrical gripping section have a second outer diameter, said second outer diameter being smaller than said first outer diameter, said hook means is located in said gripping section.

5. A supply magazine according to claim 1 wherein said hook means is located substantially centrally on the spindle.

6. A supply magazine according to claim 2 wherein each of said hooks have a substantially rectangular cross sectional configuration with a substantially planar engaging surface.

7. A supply magazine according to claim 1 wherein said clamp pad having a bottom engaging surface and a forward engaging surface, said bottom engaging surface is designed to engage the area of the spindle axially adjacent said hook means, said forward engaging surface having a configuration which forms the resistive wall section in the leader.

8. A supply magazine according to claim 7 wherein said clamp pad has a recess, said clamp pad is positioned such that when the cover is in the closed position the hook means can pass through the recess and the resistive wall section, said clamp pad is secured to the cover such that when the cover is in the open position the bottom surface is spaced from the spindle so as to allow the leader of the pouch to be easily placed between the spindle and clamp pad.

9. A supply magazine according to claim 7 wherein said clamp pad is spring biased such that it applies a force against the spindle adjacent the hook means.

10. The supply magazine according to claim 7 wherein said forward engaging surface and bottom engaging surface have a configuration such that the leader forms a generally L shaped configuration when the cover is placed in the closed position and said hook means is just forward of said forward engaging surface.

11. A supply magazine according to claim 2 wherein said clamp pad includes spaced apart recesses to accommodate passage of said first and second pair of hooks therethrough.

12. A supply magazine for use in an apparatus for removing individual sheet film, the sheet film being arranged in a stack and placed within a light-tight pouch having a leader secured to the leading edge, said supply magazine comprising;
- a base having a receiving section for holding and retaining the stack of sheet film within the light-tight pouch;
- a cover secured to said base by hinges along one side permitting said cover to move between a closed position and an open position on said base;
- a take up spindle rotatably secured within said base for winding of the pouch thereon;
- hook means secured to the spindle for engaging the leader of the pouch; and
- means for biasing said leader toward said spindle in the area which said hook means rotates when said cover is in the closed position, said means for biasing said leader having a configuration such that a resistive wall section is formed in the leader so that when said spindle is rotated said hook means engages said leader at said resistive wall section allowing the pouch to be wound around the spindle.

13. A supply magazine according to claim 12 wherein said hook means comprises a first pair of axially aligned hooks and a second pair of axially aligned hooks, said first and second pair of hooks are circumferentially aligned about the spindle and spaced apart approximately 180°.

14. A supply magazine according to claim 13 wherein said hook means further comprises a third pair of axially aligned hooks and a fourth pair of axially aligned hooks, said third and fourth pair of hooks are circumferentially aligned about the spindle and spaced approximately 180° apart, said third and fourth pair of hooks are spaced axially part from said first and second pair of hooks, said third and fourth pair of hooks are circumferentially offset from first and second pair of hooks by approximately 90°.

15. A supply magazine according to claim 12 wherein said spindle comprises a pair of cylindrical outer support sections and a cylindrical gripping section, said gripping section is located between said outer support sections, said pair of outer cylindrical support sections having a first outer diameter and said cylindrical gripping section have a second outer diameter, said second outer diameter being smaller than said first outer diameter, and said hook means is located in said gripping section.

16. A supply magazine according to claim 12 wherein said hook means is located substantially centrally of the spindle.

17. A supply magazine according to claim 13 wherein each of said hooks have a substantially rectangular cross sectional configuration with a substantially planner engaging surface.

18. A supply magazine according to claim 12 wherein said means for biasing said leader comprises a spring secured to the cover.

19. A supply magazine according to claim 18 wherein said spring is a leaf spring.

20. A supply magazine according to claim 19 wherein said leaf spring has a generally arcuate configuration.

21. A supply magazine according to claim 13 wherein said biasing means includes spaced apart recesses to accommodate passage of said first and second pair of hooks therethrough.

22. A supply magazine for use in an apparatus for removing individual sheet film, the sheet film being arranged in a stack and placed within a light-tight pouch having a leader secured to the leading edge, said supply magazine comprising;
- a base having a receiving section for holding and retaining the stack of sheet film within the light-tight pouch;
- a cover secured to said base by hinges along one side for moving said cover between a closed position and an open position on said base;
- a take up spindle rotatably secured within said base for winding of the pouch thereon;
- hook means secured to the spindle for engaging the leader of the pouch; and
- means for biasing said leader toward said spindle and for forming a resistive wall section in the leader in the area which said hook means rotates when said cover is in the closed position so as to cause the pouch to engage and be wound around the spindle.

* * * * *